United States Patent
Upp et al.

(10) Patent No.: US 7,120,136 B2
(45) Date of Patent: Oct. 10, 2006

(54) MOBILE STATION MOBILITY IN A WIRELESS LAN

(75) Inventors: Steven D. Upp, Bartlett, IL (US); Michael A. Stepien, Hoffman Est, IL (US); Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/831,825

(22) Filed: Apr. 26, 2004

(65) Prior Publication Data

US 2005/0237962 A1  Oct. 27, 2005

(51) Int. Cl.
*H04Q 7/20* (2006.01)
*H04L 12/56* (2006.01)

(52) U.S. Cl. .................. 370/331; 370/392; 455/433

(58) Field of Classification Search ........... 370/329, 370/331–333, 338, 389, 392, 428, 429; 455/432.1, 455/433, 435.1, 435.2, 436–440, 442–444
See application file for complete search history.

(56) References Cited

U.S. PATENT DOCUMENTS

| | | | | |
|---|---|---|---|---|
| 6,147,986 | A * | 11/2000 | Orsic ......................... | 370/349 |
| 6,160,804 | A * | 12/2000 | Ahmed et al. ............... | 370/349 |
| 2002/0159479 | A1* | 10/2002 | Watanuki et al. ........... | 370/466 |
| 2003/0174688 | A1* | 9/2003 | Ahmed et al. ............... | 370/349 |
| 2004/0121772 | A1* | 6/2004 | Rue ............................. | 455/436 |
| 2004/0122976 | A1* | 6/2004 | Dutta et al. .................. | 709/245 |
| 2004/0176023 | A1* | 9/2004 | Linder et al. ............... | 455/3.01 |
| 2004/0249960 | A1* | 12/2004 | Hardy et al. ................. | 709/229 |
| 2005/0047351 | A1* | 3/2005 | Orsic ........................... | 370/254 |
| 2005/0113086 | A1* | 5/2005 | Wilson ..................... | 455/432.2 |

OTHER PUBLICATIONS

"WI-FI In the Enterprise"; Position Paper; Proxim Wireless Networks; PP1-0104 (WI-FI in the Enterprise); Copyright 2004; pp. 1-12.
C. Perkins; "IP Mobility Support"; Network Working Group; rfc2002 Mobile IP; pp. 1-71.

* cited by examiner

*Primary Examiner*—Seema S. Rao
*Assistant Examiner*—Gregory B. Sefcheck (57) ABSTRACT

Methods and apparatus for facilitating mobility of the mobile stations in a wireless local area network (WLAN) allows uninterrupted communications as the mobile station moves. The method includes associating (501) a MNIP address (410) with the mobile station; establishing (502) a communications link between the mobile station and a first WLAN AP (109) in a first subnet (117) and associating (503) a first WLAN IP (420) address with the mobile station. Then using (505) the first WLAN IP address for an application that benefits from a persistent connection. Further included is establishing (507) a second communications link between the mobile station and a second WLAN AP 111 in a second subnet (119). When the mobile station is using the application, continuing to use the first WLAN IP address for communicating with the second subnet; and requesting (517) a second WLAN IP address in the second subnet when the persistent connection is no longer needed.

21 Claims, 6 Drawing Sheets

MOBILE STATION MOBILITY IN A WIRELESS LAN

FIELD OF THE INVENTION

This invention relates in general to communications systems, and more specifically to the method and apparatus for facilitating mobility of mobile stations in a wireless local area network.

BACKGROUND OF THE INVENTION

The ability to move and maintain a network connection while operating in a wireless local area network (WLAN) is known. Wireless protocols, such as mobile internet protocol (Mobile IP) and Inter Access Point Protocol, support wireless mobile stations as they travel between WLAN access points and different subnets. Current WLAN mobility protocols assign care-of-addresses to the mobile station to forward packets to the destination host. The mobile station asks for a new IP address as it moves from one subnet to another and associates the new mobile IP address to its permanent mobile node address.

However, such support mechanisms, e.g. care-of-addresses and routing, add unacceptable latency to TCP packets as they follow a mobile station around the WLAN and are generally too slow to support many time sensitive applications, such as Voice Over IP, which require a faster subnet to subnet handoff. Additionally, many applications, such as Microsoft Outlook, instant messaging and mounted file servers, while not time sensitive, require persistent TCP connections in order to operate properly. Furthermore, security associations between the MS and an application can be maintained without additional time consuming registrations if a persistent connection is available. Standard networking solutions, such as Layer 2 tunneling, may temporarily help to solve the latency issues but add overhead to network operations, tend to focus network traffic upon a few elements of the network, etc., which is unacceptable to most networks due, for example, to reliability issues and additional operational costs.

Clearly, a need exists for a system to facilitate the effective and efficient mobility of mobile stations, particularly when time sensitive communications and the like require a persistent connection.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENTS

In overview, the present disclosure concerns communication systems that provide service to communication units or mobile stations or more specifically user thereof operating therein. More particularly, this disclosure discusses and describes various inventive concepts and principles embodied in methods and apparatus for facilitating the mobility of mobile stations as they participate in a wireless local area network (WLAN). The communication systems of particular interest are those being developed and deployed such as WLANs, hybrid enterprise data and voice networks suitable to support time sensitive applications that operate on these enterprise networks. The mobile stations or wireless mobile stations may be referred to as subscriber devices and can include, for example, cellular or mobile phones, two-way radios, messaging devices, personal digital assistants, personal assignment pads, and personal computers equipped for wireless operation, a cellular handset or device, or the like, or equivalents thereof. These may be alternatively described as WLAN mobility clients, provided such units are arranged and constructed for operation in accordance with the various inventive concepts and principles embodied in network elements, networks, systems, electronic devices or communications units, and methods for providing, initiating, or facilitating mobility of the wireless communication units as further discussed and described herein.

The principles and concepts discussed and described may be particularly applicable to wireless communication units, devices (mobile stations), access points, and systems providing or facilitating mobility for stations in systems with short-range communications capability often referred to as WLAN systems. These WLAN systems can employ air interface or access technologies, such as IEEE 802.11, Bluetooth, or Hiper-LAN and the like or variants or evolutions thereof, preferably utilizing CDMA, frequency hopping, orthogonal frequency division multiplexing, or TDMA (time division multiple access). Furthermore, these WLANs may utilize one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As further discussed below, various inventive principles and combinations thereof are advantageously employed to support a persistent connection (e.g. connection or connectionless association with a constant or non-changing IP address) as the mobile station moves about the WLAN thereby alleviating for example, dropped connections and delay problems associated with known WLAN systems and time sensitive applications provided one or more of the principles and concepts disclosed below are utilized.

This disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the preferred embodiments.

Figure 1:
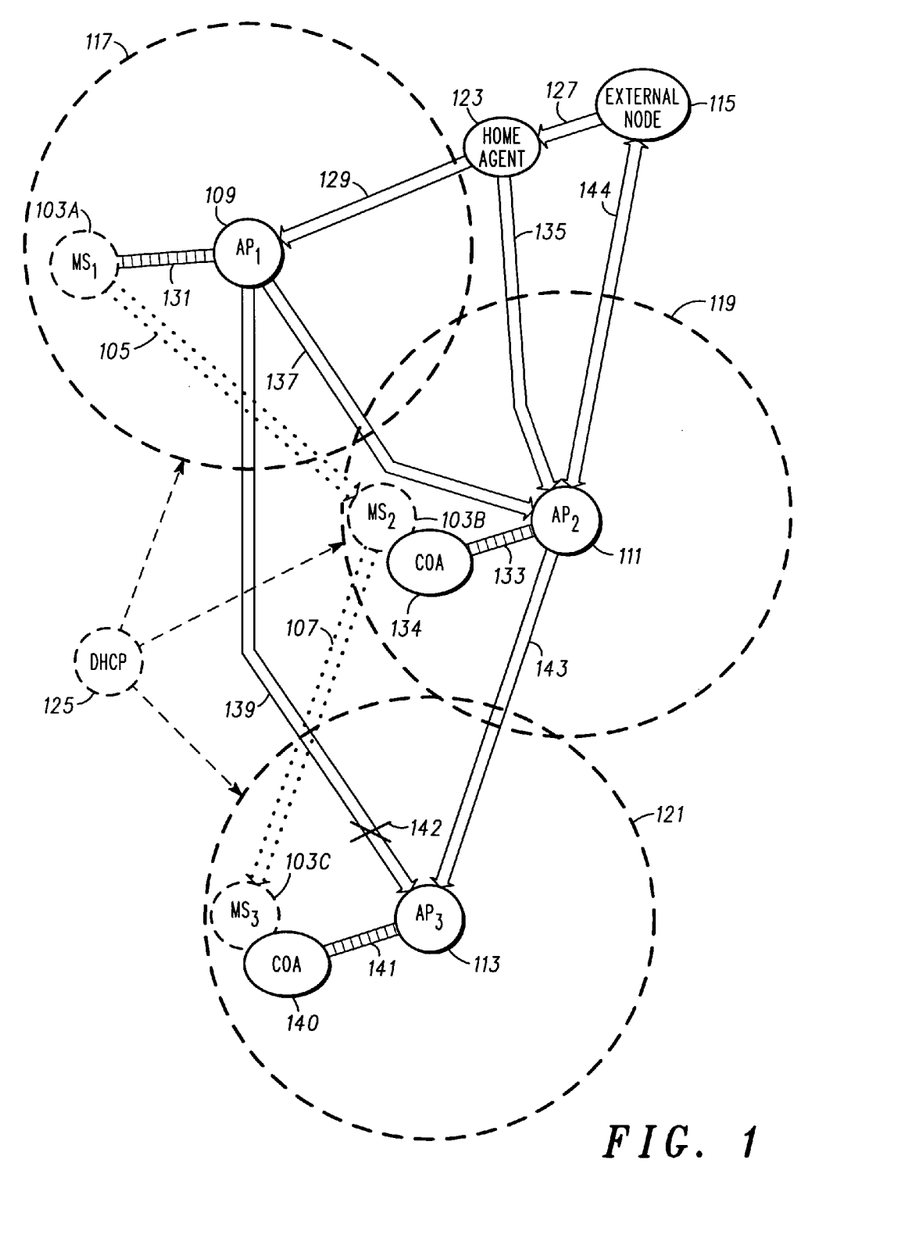
FIG. 1 depicts an exemplary wireless local area network (WLAN) including a mobile station operating therein and moving among a plurality of access points.

Referring to FIG. 1, an exemplary wireless local area network (WLAN) including a mobile station MS 103 operating therein and moving among (depicted by dashed arrows 105, 107) a plurality of access points 109, 111, 113 will now be described and discussed. To appreciate the principals and concepts associated with the WLAN and mobility therein, FIG. 1 depicts movement of the mobile station MS 103 within or among WLAN subnets during wireless communications operations. The WLAN can have a conventional architecture such as a layered network architecture having access, distribution, core and server layers, as generally known in the industry, for establishing/supporting communication links between communications end points, such as mobile stations (one depicted) and other nodes including external nodes 115 (one depicted). These communication links may use or include, for example, one or more routers, switches, computers, servers, network interface cards and the like (not specifically depicted) as well as WLAN access points (APs) and communications protocol stacks. The WLAN APs, such as WLAN AP 109, 111 and 113, can utilize 802.11x protocols and may be configured to service wireless communications units that are mobility capable such as, for example, mobile station 103.

The mobile station 103 resides and is initially operating within a first WLAN subnet 117 and as such is numbered as MS 103A. The WLAN subnet 117 is generally depicted by the WLAN subnet boundary where this boundary is typically determined by the radio coverage area or footprint established by the WLAN AP 109. Note that in practice a plurality of APs can all be operating as a subnet with the physical boundary being determined by the composite of their respective radio coverage areas and the logical boundary of the subnet determined by a subnet address space as is known. A second subnet 119 and a third subnet 121 are also shown where there respective physical boundaries are determined by the radio coverage areas of AP 111, 113 respectively. As the MS 103A moves 105, physically or logically, from the first subnet 117, e.g. AP 109, to the second subnet 119, the MS is designated MS 103B in the second subnet. Similarly a move 107 to the third subnet 121, e.g. AP 113, is shown by a designation for the mobile station of MS 103C in the third subnet. In the discussions below mobile station 103 or MS 103 will refer to the mobile station in general, whereas mobile station 103A,B,C or MS 103A,B,C will refer to the mobile station as associated with the first, second, or third subnet and corresponding AP, respectively.

To facilitate mobility of the mobile station 103 a home agent 123 is employed. The MS 103 is provided, assigned or otherwise obtains a mobile node internet protocol (MNIP) address 410 (see FIG. 4, note that all 4xx reference numerals are found in FIG. 4). The MNIP can be programmed into the MS 103 at initial provisioning and then loaded on power up as part of the boot process. Alternatively, the MNIP address can be assigned statically by a system administrative function or dynamically via a DHCP (Dynamic Host Control Protocol) server 125 providing such services to the WLAN when, for example, the mobile station 103 is initially associated with the WLAN. The MNIP address is an IP address that is associated with the mobile station 103 or maintained by the MS 103 at least for the duration of its operations on the WLAN. Typically the MNIP address will be within the address space of a home network or subnet. The duration of operations on the WLAN of the mobile station 122 may be viewed as any operations on any of the various APs prior to the mobile station ceasing operations (for example powered off) or removal of the mobile station beyond the influence of the boundaries of the WLAN and corresponding wired network. Generally, the MNIP address is an IP address that terminates on or can be intercepted by the home agent 123 and is associated with the MS 103. The home agent 123 may reside physically anywhere within and be accessible via the enterprise network or WLAN as with home agent 123 in FIG. 1, but may be represented virtually within each WLAN subnet.

Additionally, the mobile station 103A, 103B, 103C is assigned or associated with a WLAN internet protocol (WLAN IP) address 420 (see FIG. 4) that also may be referred to as a care-of-address (COA) at least whenever the MS is operating on or in any subnet other than its home subnet. Other than when the MS 103 is operating within its home network or subnet, the mobile station 103 is assigned a WLAN IP address as well as the MNIP address 410. Note that some WLANs have a virtual home network and thus MSs may never operate in the home subnet, in which case the mobile station will always utilize two IP addresses. Typically, the WLAN IP address is subnet specific and thus will designate the subnet or AP, e.g. point of attachment to the WLAN for the MS 103. The WLAN IP address is obtained upon association with an AP, e.g. subnet, via a DHCP request initiated by the MS. To facilitate mobility of MS 103 the current WLAN IP address will be associated with the corresponding MNIP address for the mobile station 103 via a known registration process initiated by the MS 103 with the home agent 123, where this registration process can be referred to as mobile IP registration. In general, the home agent 123 is responsible for tracking the location or point of attachment within the WLAN for mobile stations, such as MS 103, during their operations on the WLAN and does so by mapping or associating the WLAN IP address 420 to the MNIP address 410.

Figure 4:
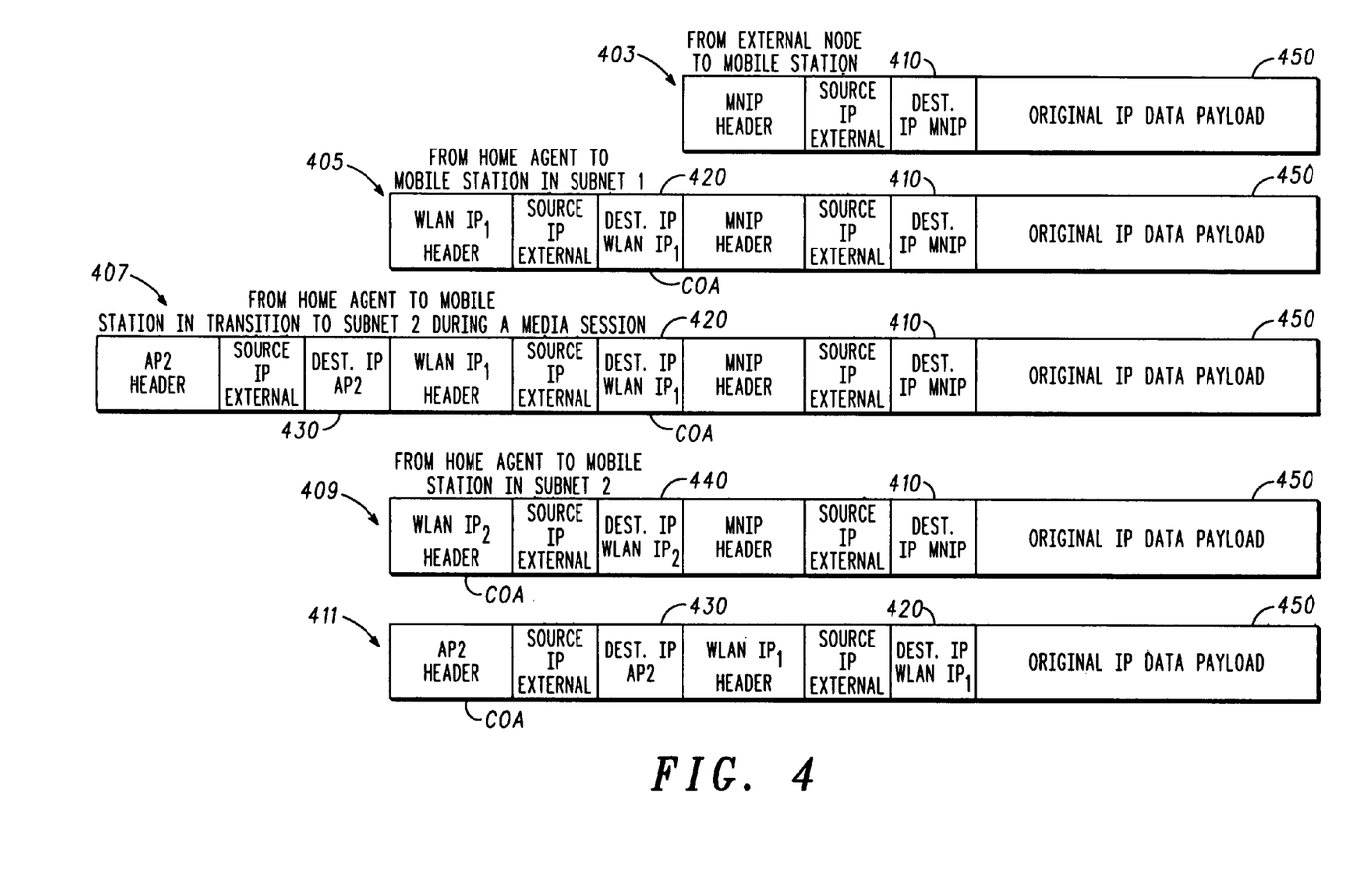
FIG. 4 shows a diagram depicting exemplary datagrams to support mobility in the FIG. 1 network.

Thus, when the external node 115 wants to said a message to the MS 103, such as the message or payload 450 (see FIG. 4), the external node will add an IP Header or MNIP header to the message or payload 450 to provide a packet or datagram 403. The header includes the MNIP address 410 as the destination address and the resultant IP packet for the MS 103 will be sent over the path or communication link 127 to the MS 103. If the MS 103 is operation in its home subnet this datagram 403 will be routed in accordance with normal IP network routing techniques and delivered directly to the MS. Otherwise, the home agent 123 will intercept this packet by virtue of recognizing the MNIP address. The home agent 123 will forward, via the path or link 129 using known networking mechanisms and protocols, a resultant packet or datagram 405 to the MS 103A, specifically the first subnet, e.g. AP 109, by adding a WLAN $IP_1$ header or COA header to the original packet with the presently registered or associated WLAN $IP_1$ address 420 (COA) as the destination address. AP 109 will then forward the resultant packet 405 to the MS 103A via the link, path, or air interface 131 using a MAC address for the MS as is known. As shown in FIG. 4, the process of encapsulating the MNIP header with the MNIP address 410 and original data 450 within another header, e.g. WLAN $IP_1$ header with WLAN $IP_1$ address 420 (datagram 405) is also referred to as tunneling, e.g. Mobile IP tunneling. Note that for simplicity, FIG. 1 does not specifically depict a COA agent associated with MS 103A is shown with MS 103B and MS 103C although it is understood to be present. Note that the COA agent generally is the destination for the WLAN IP address and is thought of as one end of the Mobile IP tunnel. The network communication links 127, 129 and all others in FIG. 1 can use known networking infrastructure components such as routers, switches, gateways and so forth that are not specifically depicted. For example, in the diagram of FIG. 1 as will become clear it is understood that the APs include a switching function. In practical systems the APs and switches may be separate entities.

The MS 103A can move from the first subnet 117 to the second subnet 119 as depicted by the arrow 105 and after the move the MS 103 is shown as MS 103B. Note that this "move" can be the result of a physical relocation or in real life systems with overlapping radio coverage among APs simply a logical relocation to a different AP due to radio interference, load management, etc. Furthermore, such movement can occur during active time critical communications on the persistent connection. In accordance with mobile IP standards when the MS 103 has relocated to the second subnet (assuming the first and the second subnet are different, e.g. different address spaces), the MS 103B will attempt to renew its IP address lease from the DHCP server 125. If the mobile station has moved to a different subnet within the WLAN, the mobile station may not be assigned WLAN $IP_1$ but instead be assigned WLAN $IP_2$ 440 (see FIG. 4). The WLAN $IP_2$ address becomes the MS 103B's new care of address (COA) and it will be indicative of the MS's point of attachment to the WLAN According to mobile IP standards the MS will mobile IP register the new WLAN $IP_2$ address with the home agent 123 thereby making it the new COA. Note that a foreign agent may be present in or support each subnet, in which case the foreign agent will facilitate the registration process and in fact the COA will be the IP address for the foreign agent as will be discussed below with reference to FIG. 7. Alternative and preferred embodiments use a co-located care of address approach where the MS acts essentially as the foreign agent and handles mobile IP registration, etc via the co-located COA agent 134. Thereafter data or messages intended for the MS 103B will be addressed to the MNIP address 410, intercepted by the home agent 123, and tunneled via for example, the link 135 through AP 111 over link 133 to COA agent 134 associated with the WLAN $IP_2$ address 440 as shown by the datagram 409. Note that setting up the new Mobile IP tunnel over link 135 includes tearing down the previous tunnel over link 129. One problem with the mobile IP approach as described is the time that is often required for the DHCP, registration, and tunneling processes and thus the impact on time critical connections, such as media (voice, video, etc).

Another technique that does not use mobile IP that has been proposed/offered by suppliers such as Proxim relies on WLAN mobility techniques such as defined by IEEE 802.11 or extensions thereof to resolve the concern noted above regarding the time required for mobile IP processes. In this approach essentially the tunnel from the home agent 123 to an access point such as AP 109 is extended via for example link 137 to the new access point AP 111. This can be accomplished by the WLAN infrastructure and relies on information, for example the identity of a previous AP (Mac address or IP address for example), provided by the MS when the MS associates with the new AP 111. This information is recognized by AP 111 and used to contact the previous AP 109 and to initiate a layer 2 tunnel between the two APs, assuming AP 109 is the original or anchor AP. Thus datagram 407 is forwarded via the tunnel or layer 2 tunnel between the APs, where as shown the datagram includes an additional header, designated AP2 header, that includes AP2 IP address 430 as the destination address. AP2 111 will strip off the AP2 header and forward the message using MAC addresses to the mobile station or more specifically the COA agent 134.

Note that if the previous AP was not the anchor or original AP, then when a new AP contacts the previous AP it will be informed that a tunnel exists between the previous AP and an anchor AP and thus a layer 2 tunnel between the new AP and the anchor AP will be setup. This layer 2 tunnel is depicted by the path or link 139. For example if the MS 103 moves to the third subnet 121 as shown by MS 103C and tells AP 113 the identity of the previous AP, e.g. AP 111, AP 113 can contact AP 111 and be made aware of the layer 2 tunnel 137 between AP 111 and AP 109. Thus a new layer 2 tunnel 139 can be established between the current AP, e.g. AP 113, and the original or anchor AP 109 and the old tunnel 137 can be dropped. A variety of approaches exist for taking care of these activities. For example, the AP 113 can initiate the layer 2 tunnel with the anchor AP 109 and the AP 109 can drop the earlier layer 2 tunnel over 137. The previous AP 111, once contact has been established with the new AP 113, can inform the anchor AP and the anchor AP 109 can initiate the new layer 2 tunnel over 139 and drop the old tunnel over 137. In these situations, datagrams or messages that are forwarded over the new layer 2 tunnel via link 139 will take the form of the datagram 407 with the AP2 header replaced by an AP3 header with AP3 IP address used as the destination address. The AP3 will forward the data or message to MS 103C, specifically the corresponding COA agent 140 via the wireless link 141.

While the above discussed WLAN mobility techniques resolves the time delay issue of mobile IP since the AP to AP layer 2 tunnels can be established quickly (<100 msec), reflection on the above will reveal some concerns. For example, all traffic goes through one of the access points or more specifically an associated switch. These switches or access points tend to reside at the edge (e.g. near the mobile stations or clients) of the LAN. In order to avoid communication failures these switches will need to be very reliable since a great deal of traffic can depend on one switch or AP. Furthermore, given that the anchor AP is the original AP that mobile stations encounter, any traffic patterns found in the population of mobile stations will be reflected in relative AP or switch loads. For example, suppose AP 109 is near the only point of entry for a large office building. All or most mobile stations are likely to initially associate with AP 109 and thus AP 109 will be the anchor AP for all or most traffic in the WLAN possibly placing an undue burden on this access point for message processing as well as reliance of the WLAN on the reliability of this access point or corresponding switch. Other applications, such as shopping malls or airports similarly have a limited number of points of ingress/egress and similarly can suffer from the same loading/reliability issues.

The discussion below will describe various inventive concepts and principles embodied for example as apparatus and methods that advantageously address these concerns. In summary methods and apparatus are provided where under proper circumstances mobile IP or some similar techniques are used to move the anchor AP from one to another AP, e.g. from AP 109 to AP 111 and thus the layer 2 tunnel 139 is not required 142 for any extended period of time. If needed in order to support mobility, the layer 2 tunnel 143 is established between AP 111 and AP 113. Again at the proper time the layer 2 tunnel 143 can be torn down and the anchor AP moved to AP 113 via mobile IP techniques. This will result in the tunnel over 135 being replaced by a tunnel from the home agent to AP 113 (not depicted).

Figure 2:
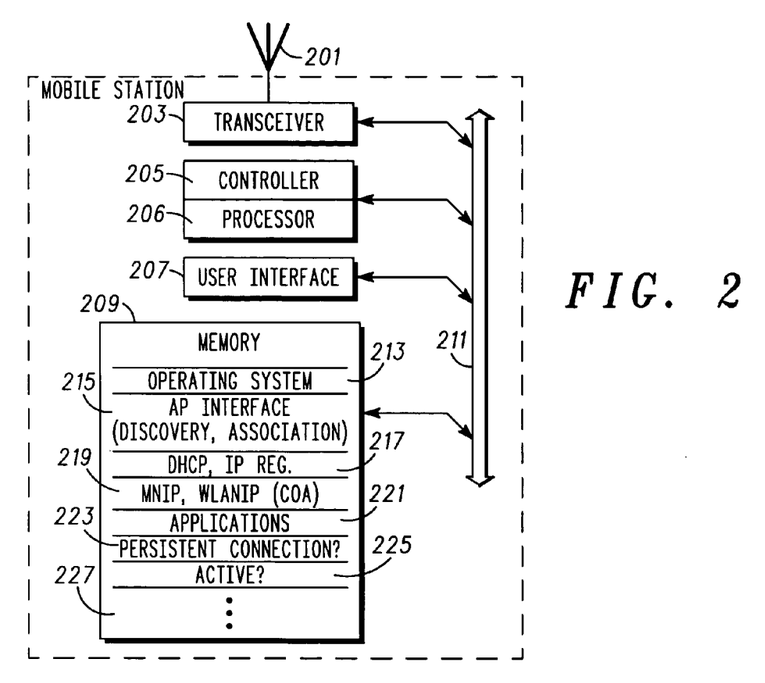
FIG. 2 depicts a block diagram of an exemplary mobile station.

Referring to FIG. 2, a block diagram of a mobile station (MS), such as the MS 103 noted above, will be described and discussed. The MS is similar to commercially available units, modified according to the following concepts and principles. The mobile station includes various elements, including for example, a transceiver 203 coupled to an antenna 201, a controller 205 with at least one processor 206, a user interface 207, and a memory 209 inter coupled as required by, for example, a bus arrangement 211. The transceiver 203 is generally known and includes one or more transmitters and receivers. For example, the mobile station may be a multi mode MS suitable for operation on one or more cellular or cellular like wide area networks as well as a plurality of WLANs having different access technologies or air interfaces. In this event, the transceiver will include sufficient functionality to interface with the particular networks and thus the transceiver may be a software defined transceiver or multiple transceivers or some combination of each.

The controller is responsible for overall control of the mobile station including controlling the transceiver in order to support air interfaces, various signal processing duties, supporting the user interface 207, running various applications and the like. These duties are performed by the processor, which can comprise one or more general purpose processors or digital signal processors that are generally available from suppliers, such as Motorola, Inc. The particular operations/functions of the processor 206, thus controller 205, are determined by the execution of software instructions and routines that are stored in the memory 209, where the memory is generally known and can be comprised of some combination of RAM, ROM, EPROM, magnetic based memory, and the like.

The software instructions generally include, for example, an operating system (OS) 213 data and variables for providing overall control. Additionally an AP interface or interaction routine 215 including discovery and association functions and the like to support the air interface, etc with one or more WLANs. Further included are mobile IP routines 217 for supporting WLAN IP address requests via a DHCP request and IP registration as well as routines and databases 219 for obtaining and associating a MNIP address with the MS and obtaining and associating with the MS if needed a WLAN IP address and performing COA functions. Further depicted are applications 221 such as, for example, email, VOIP, streaming video and others requiring TCP/IP, SCTP, or UDP, etc. connection or connection less links in addition to routines 223 for assessing the need or benefits of a persistent connection for the respective applications and routines 225 for determining whether the connections are active. Additional routines 227 such as user interface drivers, WAN support routines, etc. will be included/needed as will be recognized by one of ordinary skill, but a discussion of those routines is not relevant to the present application.

In operation the MS is arranged for operating in a WLAN and further for facilitating mobility within the WLAN. The transceiver 203 is operable to support communications activities and links within the WLAN, specifically with corresponding WLAN APs. The controller 205 is cooperatively operable with the transceiver 203 to support operations within the WLAN using for example the AP interface routines 215 among others. These functions may vary depending on the WLAN access technology but would include for example in IEEE 802.11 networks, discovery of one or more APs via known scanning techniques, establishing communication links with the APs, e.g. associating with one of the APs including satisfying or providing any authentication or authorization requirements or procedures.

Note that the controller is operable to associate a MNIP address with the mobile station using the routines and databases 219, where the MNIP address can be provided and stored on initial deployment or provisioning of the MS. Alternatively, the MNIP address can be obtained and thus associated with the MS upon association with the AP using, for example, the DHCP routines 217. Having established the communication link, associated with the AP, and assuming no time critical active applications or connections, the controller cooperatively with the transceiver will further associate with a WLAN IP address in the subnet corresponding to the AP. If the WLAN IP address has not previously been provided or if the present WLAN IP address in the database 219 is not within the address space of the present subnet, the DHCP routines are utilized to request, via the WLAN, a WLAN IP address, from, for example, a DHCP server. The MS after obtaining the WLAN IP address in the first subnet is now attached to the WLAN. Note that the request often referred to as a DHCP renewal request is sent by the MS and may be intercepted by the AP and immediately be accepted/responded to without communicating to the DHCP server if the AP understands the address to be part of its subnet and is valid for the MS through communication from AP 111 to AP 109 via a tunnel as noted above This WLAN IP address will become/be used as the MS care of address (COA) by the routines 219 after completing a mobile IP registration with a home agent serving the WLAN using the routines 217. In one embodiment this is referred to as co-located COA since the MS will operate as one end of a mobile IP tunnel from the home agent as discussed earlier. The process of IP registration results in an agent that is local to the MS for co-located COA embodiments, associating the MNIP and WLAN IP addresses and thus "delivering" packets destined for the COA to the MS. As noted above the IP registration allows the home agent serving the WLAN to associate the MNIP address and WLAN IP address, in order to properly route messages to the MS. After mobile IP registration, the MS may be viewed as having a persistent presence within the WLAN, e.g. external nodes can send datagrams to the MNIP address and the home agent will tunnel these packets to the WLAN IP address. After the IP registration the controller can use the WLAN IP address for an application 221 in the subnet, e.g. to support communication needs of the application.

Generally datagrams such as discussed above with reference to FIG. 4, specifically datagram 403, 405 are used at least for control communications or messages, where control messages are messages related to setting up, tearing down, and otherwise controlling a connection or communication. Bearer messages, e.g. those devoted to substantive data, for example, voice over IP (VoIP) or media packets, from an external source are normally addressed directly to the WLAN IP address (home agent is bypassed). Typically packets or messages from the MS will be sent directly to the destination via the present AP, for example AP 111 via a path such as path or connection 144, rather than through the home agent, although control messages will use the MNIP address as the source address.

When the MS moves to another or second subnet and corresponding AP or otherwise needs to leave the original subnet and AP, the controller 205 is further cooperatively operable with the transceiver 203 to scan for a suitable second AP. Once the second AP is located, the controller operates to establish a second communications link with the second WLAN AP as the MS transitions between the first subnet and a second subnet corresponding to the second AP. Then the MS becomes associated as described above with the second AP. After that and in stark contrast to mobile IP, the MS, specifically controller and transceiver will use the first WLAN IP address established with the original AP and subnet for a persistent connection in the second subnet if any applications that are running will benefit from the persistent connection.

Whether an application will benefit is determined using the persistent connection and active routines 223, 225. An application will benefit from a persistent connection if it is determined that messages, packets, etc. are likely to be exchanged between a source and destination (either being the MS) using the WLAN IP address. The application will benefit also if it is determined that these messages or the connection will be interrupted or dropped to the disadvantage of the application or user thereof if the WLAN IP address does not remain constant. The persistent connection routine can be a lookup routine that compares applications that are running with a database entry indicating whether a persistent connection is required for the application. The active routine again determines whether any applications are using persistent connections, e.g. is there an active control or bearer path or session. Note that active may imply that such a path or session has experienced message traffic within the last predetermined amount of time (2 seconds or other experimentally determined amount of time) or simply that such a path has been setup and not torn down. Again, this is largely keeping track of link or connection status and comparing the respective status with the appropriate tests or thresholds, etc. to make the requisite determinations.

In order to use the original or presently assigned WLAN IP address in the new subnet (foreign subnet), techniques such as WLAN mobility techniques as discussed above can be used. To use AP to AP or WLAN layer 2 tunneling that underlies the WLAN mobility techniques, the MS as part of the associating with the second AP, assuming it is part of a different subnet, also forwards information (IP or MAC address) identifying the original AP or AP that was last providing service. This allows the new AP to contact the original AP and establish a tunnel from the original AP through the new AP to the MS via the original COA, e.g. original WLAN IP address. Once the tunnel is established messages and in particular control messages, packets, or datagrams sent over the tunnel will resemble the datagram or packet 407. Note that bearer packets may take the form of datagram 411 with the second AP header added including the second AP IP address 430 as a destination to tunnel the bearer message originally addressed to the first WLAN IP address 420 to the MS in the second subnet.

When it is later determined that the persistent connection is no longer needed or not immediately needed, such as not active even when persistence is still advantageous, the MS, specifically controller 205 and transceiver 203 can request, via DHCP processes, a new or second WLAN IP address that is compatible with, e.g. routable to and within, the second subnet. Mobile IP registration by the MS, controller and transceiver, will result in changing association information, such that the local agent (COA agent) as well as the home agent now associates the second WLAN IP address and MNIP address. When the second WLAN IP address is requested or when IP registration occurs, either one can be used as a signal to drop the AP to AP layer 2 tunnel. Thereafter, messages for the MS will resemble the datagram 409 or if bearer messages, the datagram 409 less the MNIP header.

Figure 3:
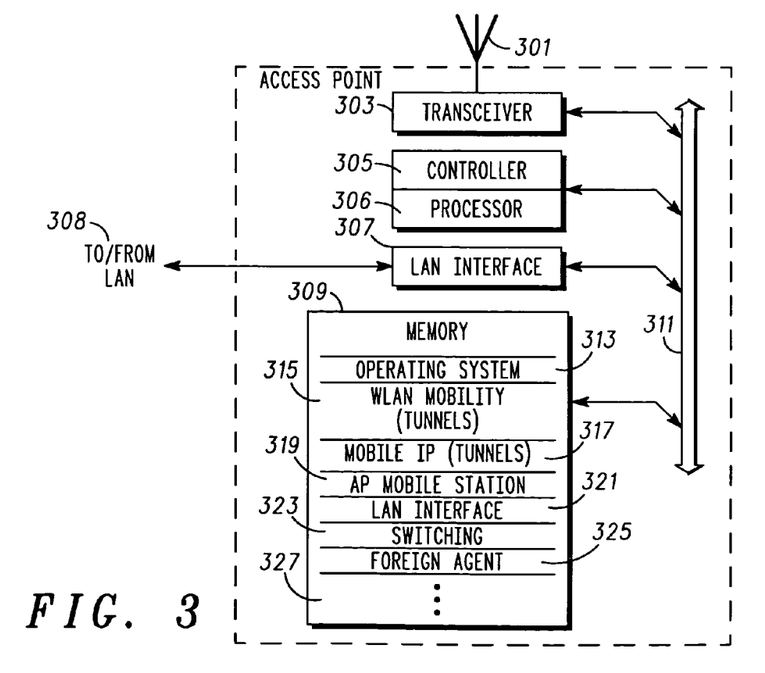
FIG. 3 depicts a block diagram of an exemplary WLAN AP.

Referring to FIG. 3, a block diagram of an exemplary WLAN AP will be described and discussed. It is expected that this discussion will further clarify the concepts and principles according to the present invention from the perspective of the network. The WLAN AP is similar to commercially available units, modified according to the following concepts and principles. The WLAN AP includes various elements, including for example, a transceiver 303 coupled to an antenna 301, a controller 305 with at least one processor 306, a network or LAN interface 307 such as an Ethernet transceiver, for communicating with a wired network or LAN 308, and a memory 309 inter coupled as required by, for example, a bus arrangement 311. The transceiver 303 is generally known and includes a transmitter and a receiver. The transceiver will include sufficient functionality to interface with the particular MSs according to the access technology, such as IEEE 802.11, employed by the WLAN and may be a software defined transceiver or hardware based transceiver or some combination of each.

The controller is responsible for overall control of the WLAN AP including controlling the transceiver in order to support air interfaces with MSs, various signal processing duties, supporting the LAN interface 307, facilitating mobility, and the like. These duties are performed by the processor, which can comprise one or more general purpose processors or digital signal processors that are generally available from suppliers, such as Motorola, Inc. The particular operations/functions of the processor 306, thus controller 305, are determined by the execution of software instructions and routines that are stored in the memory 309, where the memory is generally known and can be comprised of some combination of RAM, ROM, EPROM, magnetic based memory, and the like. A described here the WLAN AP also includes switching functionality although it is understood that these functions can be included in a separate entity.

The software instructions generally include, for example, an operating system (OS) 313 data and variables for providing overall control. Additionally WLAN mobility routines for managing tunnels, etc. with other APs, mobile IP routines 317, AP to mobile station interface or interaction routine 319 including advertising or probing and association functions and the like to establish and support air interfaces, etc with one or more MSs. Further included are LAN interface routines 321 for inter coupling the AP to other LAN entities, such as the home agent, other APs, DHCP server, routers servers, etc., and switching routines 323 to facilitate tunneling and routing of messages, etc. Further depicted are foreign agent functions 325 that may be utilized in some embodiments as will be discussed below. Additional routines 327 such as network/traffic management, fault status, and the like will be included/needed as will be recognized by one of ordinary skill, but a discussion of those routines is not relevant to the present application.

In operation, the WLAN AP, such as any one of the WLAN APs 109, 111, 113, is arranged for operating within a WLAN and further for facilitating mobility of MSs within the WLAN. Additionally, in accordance with various exemplary embodiments, the WLAN AP must quickly establish communications links to the mobile station to facilitate transferring time sensitive connections with the mobile station 122 without the loss of quality or data. The transceiver 303 is operable to support communications links within the WLAN. The controller 305 is cooperatively operable with the transceiver 610 to establish a communications link with a MS within the WLAN, associate with the MS, etc. using the routines 319.

The controller 305 is further operable to recognize when the MS uses a first WLAN internet protocol (WLAN IP) address that is different from an IP address range supported by the AP in it's respective subnet. While associating, or as part of exchanging information, with the MS regarding it's previous AP (identity, etc.), this AP will recognize an IP address that does not fit in its address range or recognize that the MS is not requesting a new WLAN IP address using the WLAN mobility routines 315. The WLAN AP, specifically controller 305 and LAN interface 307 or transceiver 303, after the recognizing function, will operate to initiate a layer 2 tunnel to a first subnet upon recognition that the first WLAN IP address is different from the IP address range supported by the AP. This is accomplished using the routines 315 and previous AP identity information provided by the MS with the specifics as discussed earlier. Thus datagrams that are time sensitive can be delivered to the MS via the layer 2 tunnel where these datagrams are similar to the datagram 407 or 411 depending on whether a control or bearer message is being delivered.

Once the MS makes a request for a second WLAN IP address the layer 2 tunnel can be terminated by the AP or the AP at the other end. Then the controller cooperatively with the transceiver operates to facilitate mobile IP registration with a home agent to associate a Mobile Node IP (MNIP) address for the mobile station with the second WLAN IP address as a Care of Address for the MS. This is normally initiated by the MS for a co-located COA or on behalf of the MS where a foreign agent as implemented by the foreign agent routines 327 is used. Note that after the mobile IP registration the MS has a new WLAN IP address and packets resembling datagram 409 can be used to forward messages, particularly control messages to the MS. Bearer messages will resemble datagram 409 minus the MNIP header information in some embodiments. It is further noted that the point of origin for any further layer 2 tunnels has been shifted to the new AP. Thus, the above noted problems, namely too much time delay and improper traffic distribution/reliability issues have been resolved.

Figure 7:
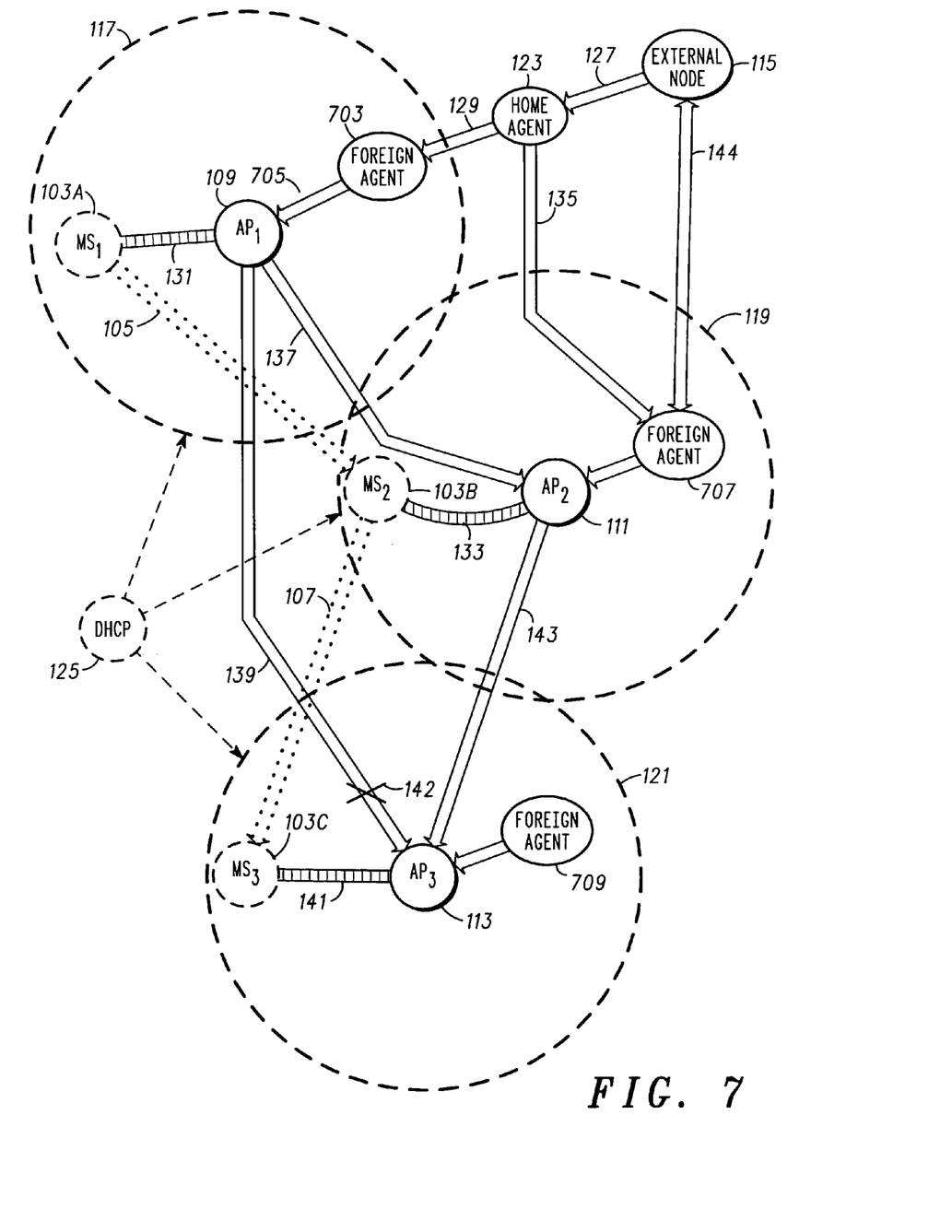
FIG. 7 depicts another embodiment of a WLAN using foreign agents to facilitate mobility.

The above discussions have largely dealt with one embodiment where the MS includes co-located COA functionality, for example, the COA agents 134, 140. In another embodiment, a WLAN can support mobile IP using a foreign agent where the foreign agent is similar to a foreign agent as defined by the mobile IP standards with modifications implemented according to the principles and concepts noted below. Note that the foreign agent can be combined within an AP as shown by the routines 325 or closely associated with the AP in another and separate entity, such as depicted in FIG. 7. The foreign agents 703, 707, 709 may, for example, be included with an AP controller embodied within an attached switch (generally known but not specifically depicted). The foreign agent provides layer 3 network mobility using techniques such as Mobile IP and is responsible, for example, for assigning new WLAN IP addresses to mobile stations, facilitating Mobile IP registration with the home agent, and supporting mobile IP tunnels from the Home agent to the foreign agent. Messages over these tunnels use datagrams similar to 405 or 409 where the WLAN IP address will be the IP address for the corresponding foreign agent. As the MS moves from subnet to subnet e.g. between foreign agents the previous foreign agent can utilize the layer 2 tunnel that is created between corresponding APs. For example in the FIG. 7 embodiment, the foreign agent 703 in the first subnet 117 receives datagrams destined to the MNIP address from the home agent 123 via a tunnel over link 129 and forwards these datagrams via the link 705 through AP 109 and over air interface 131 to MS 103A. When the MS moves to subnet 119 and AP 111 the layer 2 tunnel 137 is set up if needed as noted above. Note that this tunnel can be used by foreign agent 703 to continue to deliver datagrams to MS 103B through the (layer 2) tunnel to AP 111 and over air interface 133.

This tunnel as noted will exist if needed and at least temporarily between APs when the mobile station moves to a second AP. The mobile station upon association to the new AP, e.g. AP 111 will discover the existence of a new foreign agent 707 through known agent solicitation or discovery techniques and perform mobile IP registration through the foreign agent to the home agent. This will update the Home Agent with the new location of the mobile station for the persistent IP address known as the mobile node IP address. However after the foreign agent 707 in the new subnet is updated with the new mobility binding to the home agent 123, the MS performs the same functions described earlier to handle the need to tear down the layer 2 tunnel over 137, e.g. by performing DHCP when appropriate or as circumstances such as no active media streams permit. Note that when the layer 2 tunnel over 137 is torn down, a mobile IP tunnel over 135 from the home agent 123 to the foreign agent 707 is concurrently established and the mobile IP tunnel to the foreign agent 703 is abandoned. As the MS moves to subnet 121 and access point 113 similar activities occur and foreign agent 709 will be discovered, etc. etc.

Thus mobile IP techniques using foreign agents can be combined with WLAN mobility techniques in order to address the above noted weaknesses of each. By combining both techniques the anchor AP from WLAN mobility concepts can be moved to properly distribute traffic using mobile IP concepts and yet this movement can be done without interrupting time critical connections.

It will be useful to review the mobile station procedures in accordance with various exemplary embodiments to understand better the principals and concepts associated with time sensitive applications in a WLAN mobility IP network. FIG. 2 depicts the methods and decision processes used by the mobile station as the mobile station moves within WLAN subnets during mobile capable wireless communications unit operations.

Figure 5:
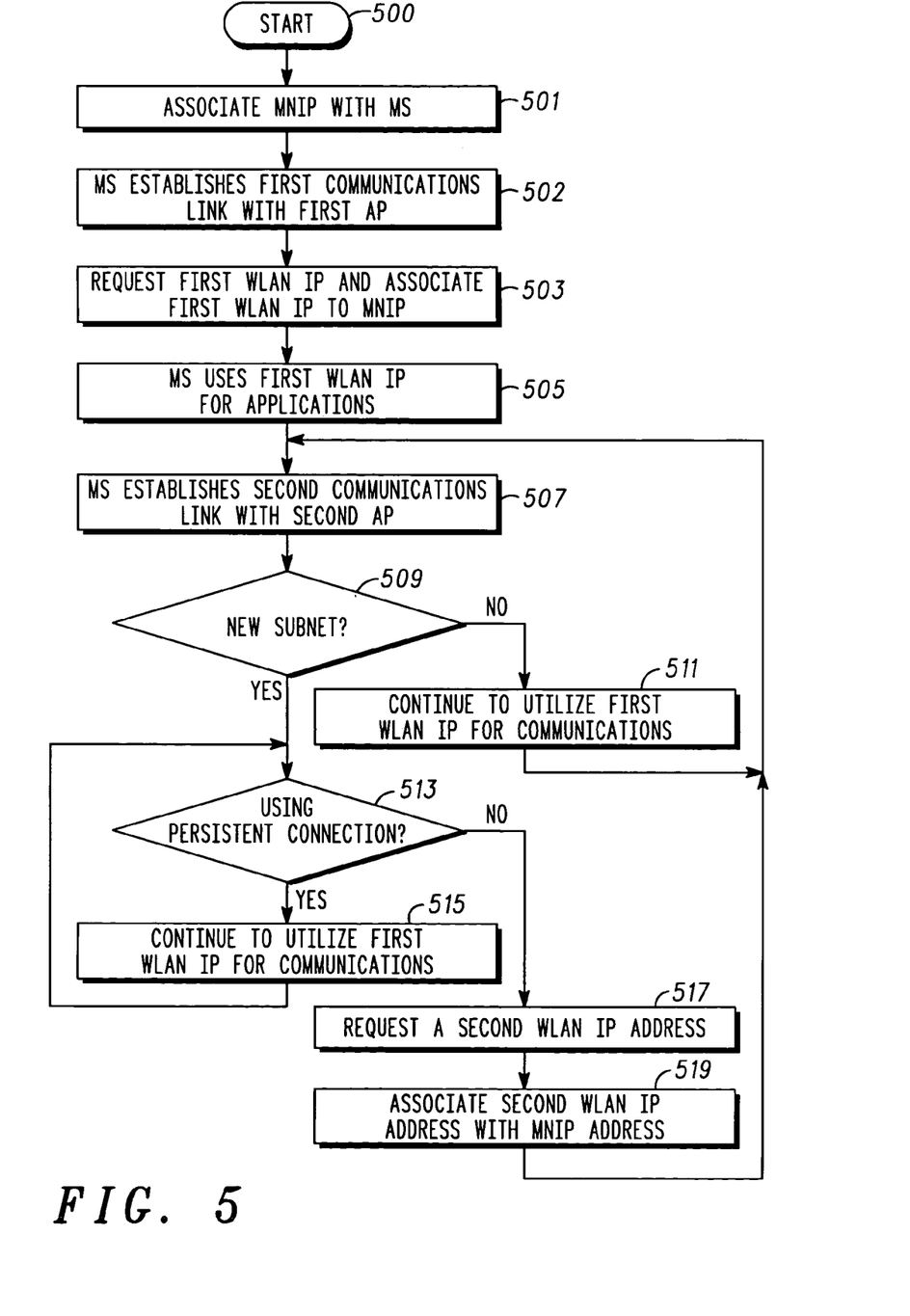
FIG. 5 shows a flow chart illustrating an exemplary method, in a mobile station, of facilitating mobility.

Referring to FIG. 5, a flow chart illustrating an exemplary method of facilitating mobility of a MS in a WLAN will be described and discussed. This method may be advantageously practiced by a mobile station, such as the mobile station of FIG. 2 operating in the WLAN of FIG. 1 each configured and operating as noted above. Note that the method can be practiced by other apparatus, providing they have similar capabilities and operate similarly. Note that many of the concepts and principles embodied by the method of FIG. 5 have been discussed above and that this review will be more in the nature of a summary with the reader referred to earlier discussions for additional details.

The method begins at 500 and at 501 a MNIP address is associated with or assigned to a mobile station, for example via provisioning the MS or initial network access and registration and then loading or linking the MNIP as appropriate on power up or the like. At 502 a first communications link between the mobile station and a first WLAN access point (AP) in a first subnet is established and the MS associates with or to the first AP. At 503 a first WLAN IP address is obtained via for example a DHCP request and the first WLAN IP address is associated with the MS as, for example, a care of address. The MNIP and WLAN IP address are now associated at the MS and, for example, at a home agent. The association at the home agent is the result of the MS initiating, for example, a mobile IP registration process.

At 505 the MS uses the first WLAN IP address for one or more applications, including applications that benefit from a persistent connection. For example the application can use or support a media application that benefits from maintaining a constant IP address for and during the media session, where the media session can exchange video or audio packets with a node external to the WLAN. Note that the media communication is typically a real or near real time communication. The first WLAN IP address can be used for the real time media communication while the MNIP address can be used to maintain a constant signaling or control connection. The MNIP address can also be used for applications such as email clients, file system clients, instant messaging clients and other applications that would have to re-establish a connection (for example TCP connection) if the MS IP address changed.

At 507 a second communication link is established between the MS and a second WLAN AP, possibly in a second subnet and the MS and second AP become associated. Then at 509 it is determined whether the second AP is part of a different subnet (e.g. different address spaces) and if so 511 shows continuing to utilize the first WLAN IP address for whatever purposes it may be needed and the method returns to 511 and resumes when communications with another AP is established. If at 509 the subnets are different, then at 513 it is determined whether one of the applications is using or benefits from a persistent connection, for example, is the connection active. If so, at 515 the MS continues to use the first WLAN IP address for the connection, e.g. communicating with the second subnet, and the WLAN responds by setting up a tunnel, a layer 2 tunnel between the first and second APs, as noted above. Thus the associating the first WLAN IP address with the MNIP address facilitates using the first WLAN IP address as a care of address to support, if needed, the persistent connection as the MS transitions between the first and second subnet.

The using the first WLAN IP address for communicating with the second subnet in some embodiments further comprises, for example, using the first WLAN IP address for the real time media communication while using the MNIP address to maintain a constant signaling or control connection. Thus and with reference to earlier discussions, the MS will receive in the second subnet any data destined for the first WLAN IP address after the data has been forwarded, via the layer 2 tunnel, from the first subnet to the second subnet (assuming different subnets), thereby extending the persistent connection to the second subnet. Similarly the MS will receive via the layer 2 tunnel in the second subnet any data destined for the MNIP address after the data was forwarded via a layer 3 tunnel to the first WLAN IP address by a home agent.

If at 513 a persistent connection is not being used or no longer being used or needed, then at 517, a second WLAN IP address that is suitable for use in the second subnet is requested, via for example, a DHCP request. Once the second WLAN IP address is assigned or obtained, then 519, shows associating the second WLAN IP address with the MNIP address and using the second WLAN IP address as the COA for the MS. The association is initiated by the MS in the form of a mobile IP registration for example and results in changing the association information at the home agent and MS, tearing down any layer 2 tunnels, and establishing a new layer 3 tunnel. Each time the MS leaves the WLAN and re-enters, via power up or travels, the method will repeat from the beginning.

Figure 6:
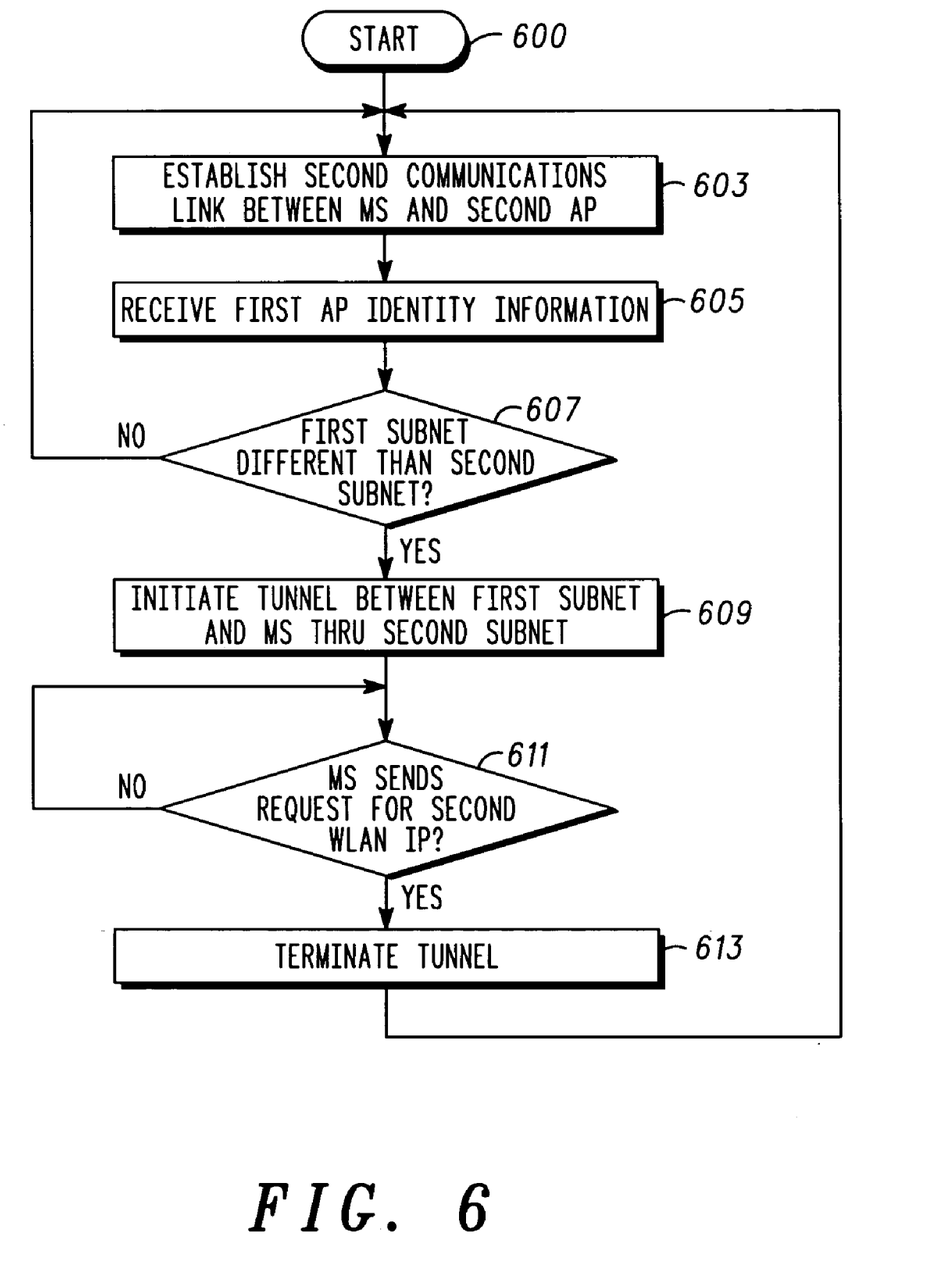
FIG. 6 shows a flow chart depicting an exemplary method, in a WLAN AP, of facilitating mobility.

Referring to FIG. 6 a flow chart of a method of facilitating mobility of a MS in a WLAN will be described and discussed. A WLAN AP or other elements of the WLAN preferably practices this method although other apparatus with similar functionality and duties could also utilize the method of FIG. 6. Much of his discussion will be in the nature of a review of certain earlier discussions and the reader is referred to those discussions for details. The flow chart of FIG. 6 starts at 600 and assumes that a MS and first AP are in communication. Thus, for example associating a mobile node Internet Protocol (MNIP) address with the mobile station and establishing a first communications link between the mobile station and a first WLAN access point (AP) in a first subnet has been accomplished. Furthermore, associating to the first AP in the first subnet and associating a first WLAN Internet Protocol (WLAN IP) address with the mobile station have occurred via the processes analogous to the method of FIG. 5 at 501–505. Note that a closely associated foreign agent could be performing the various IP address associations and registrations on behalf of the MS.

Then at 603 establishing a second communications link between the mobile station and a second WLAN AP in a second subnet is shown and it is understood that this includes associating the second AP and the MS, etc. Then at 605, the first AP identity information is received at the second AP. At 607 it is determined, via techniques noted above, whether the first subnet with the first AP is different that the second subnet. If not the method is restarted when another communication link is established. If the subnets are different, at 609, the second AP initiates a tunnel between the first subnet. e.g. first AP, and the mobile station through the second subnet, e.g. second AP. Otherwise a foreign agent associated with the second AP terminates the new tunnel. Note the tunnel is formed or may be viewed as responsive to the mobile station associating with the second WLAN AP. The tunnel is initiated by the second AP contacting the first AP using the identifying information as noted earlier. Then at 611 it is determined whether the MS sends a request for a second WLAN IP address and the method loops around 611 until the request is sent. Once the request, for example a DHCP request is sent or detected at the second AP, 611 shows terminating the tunnel.

Note that the tunnel initialized by the second WLAN AP between the first subnet and the second subnet can be used to support a persistent connection as the mobile station transitions between the first subnet and the second subnet. The persistent connection, for example, comprises: a transmission control protocol (TCP); a stream control transmission protocol (SCTP); a user datagram protocol (UDP); or any other protocol connection where signaling messages are forwarded via a home agent to the first WLAN AP and then through the tunnel to the second WLAN AP for delivery to the mobile station. The tunnel is referred to as a layer 2 tunnel and can be used to forward user datagram protocol (UDP) packets including media packets from the first WLAN AP through the second WLAN AP to the mobile station. As noted with reference to FIG. 5, the MS will forego a request for a new WLAN IP address so long as a persistent connection is needed, e.g. active.

The processes, apparatus, and systems, discussed above, and the inventive principles thereof are intended to and can alleviate problems caused by prior art mobile IP techniques as well as WLAN mobility techniques. Using the principle of delaying DHCP requests by the mobile station if a persistent connection is active or needed will facilitate timely transfer of the time sensitive data from the external node to the mobile station. This dramatically reduces the loss of data between the external node and the mobile station by eliminating the delays associated with repeated connection setup as the mobile station transitions between subnets within the WLAN.

Various embodiments of methods, systems, and apparatus for facilitating mobility in a WLAN and establishing the appropriate connections between the external node and the mobile station have been discussed and described. It is expected that these embodiments or others in accordance with the present invention will have application to many wireless local area networks that are coupled to fixed wide area networks such as the PSTN or internet. The disclosure extends to the constituent elements or equipment comprising such systems and specifically the methods employed thereby and therein. Using the inventive principles and concepts disclosed herein advantageously allows or provides for low latency, minimal loss of time sensitive data, low network overhead access to support time sensitive applications, and superior load distribution on a WLAN.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed:

1. A method of facilitating mobility of a mobile station in a wireless local area network (WLAN) comprising;
    associating a mobile node Internet Protocol (MNIP) address with the mobile station;
    establishing a first communications link between the mobile station and a first WLAN access point (AP) in a first subnet;
    associating to the first AP in the first subnet, associating a first WLAN Internet Protocol (WLAN IP) address with the mobile station, and using the first WLAN IP address for an application that benefits from a persistent connection;
    establishing a second communications link between the mobile station and a second WLAN AP in a second subnet;
    when the mobile station is using the application that benefits from a persistent connection, continuing to use the first WLAN IP address without another address being assigned to the mobile station for communicating with the second subnet for the duration of the persistent connection; and
    requesting a second WLAN IP address in the second subnet when the persistent connection is no longer needed.

2. The method of claim 1 wherein the using the first WLAN IP address for communicating with the second subnet further comprises using the first WLAN IP address for a real time media communication while using the MNIP address to maintain a constant signaling connection.

3. The method of claim 2 wherein the application that benefits from the persistent connection further comprises an application that supports a media session that benefits from maintaining a constant IP address for the media session.

4. The method of claim 1, further comprising associating the first WLAN IP address with the MNP address and using the first WLAN IP address as a care of address (COA) to support the persistent connection as the mobile station transitions between the first subnet and the second subnet.

5. The method of claim 4, wherein the requesting the second WLAN IP address further comprises obtaining the second WLAN IP address and associating the second WLAN IP address with the MNIP address and using the second WLAN IP address as the COA.

6. The method of claim 1, further comprising receiving in the second subnet any data destined for the first WLAN IP address after the data has been forwarded from the first subnet to the second subnet, thereby extending the persistent connection to the second subnet.

7. The method of claim 6, further comprising receiving in the second subnet any data destined for the MNIP address after the data was forwarded to the first WLAN IP address by a home agent.

8. The method of claim 1, wherein the MNIP address is used for applications operating on the mobile station wherein the applications including one of: email clients, file system clients, instant messaging clients and other applications that would have to re-establish a connection if an address for the mobile station changed when the mobile station moves into the second subnet.

9. The method of claim 1, wherein the associating the MNIP address with the mobile station further comprises obtaining the MNIP address by one of: provisioning the mobile station and registration with the WLAN.

10. A method of facilitating mobility of a mobile station in a wireless local area network (WLAN) comprising:
    associating a mobile node Internet Protocol (MNIP) address with the mobile station;
    establishing a first communications link between the mobile station and a first WLAN access point (AP) in a first subnet;
    associating the mobile station to the first AP in the first subnet and associating a first WLAN Internet Protocol (WLAN IP) address with the mobile station;
    establishing a second communications link between the mobile station and a second WLAN AP in a second subnet;

initiating a tunnel between the first subnet and the mobile station through the second subnet as the mobile station associates with the second WLAN AP if the first subnet is different than the second subnet and wherein the second WLAN AP initializes the tunnel between the first subnet and the second subnet to support a persistent connection as the mobile station transitions between the first subnet and the second subnet and for the duration of the persistent connection so that without another address being assigned to the mobile station; and terminating the tunnel when the persistent connection is no longer needed.

11. The method of claim 10, wherein the second WLAN AP initializes the tunnel between the first subnet and the second subnet to support a persistent connection as the mobile station transitions between the first subnet and the second subnet.

12. The method of claim 11, wherein the persistent connection comprises one of: a transmission control protocol (TCP); a stream control transmission protocol (SCTP); a user datagram protocol (UDP); and other protocol connection where signaling messages are forwarded via a home agent to the first WLAN AP and then through the tunnel to the second WLAN AP for delivery to the mobile station.

13. The method of claim 11, further comprising utilizing the tunnel to forward user datagram protocol (UDP) packets including media packets from the first WLAN AP through the second WLAN AP to the mobile station.

14. The method of claim 10, wherein the terminating the tunnel when the mobile station sends the request for the second WLAN IP address further comprises receiving a DHCP request from the mobile station.

15. A mobile station operating and facilitating mobility within a wireless local area network (WLAN), the mobile station comprising:
   a transceiver operable to support communications links within the WLAN;
   a controller cooperatively operable with the transceiver;
      to associate a mobile node Internet Protocol (MNIP) address with the mobile station;
      to establish a first communications link with a first WLAN access point (AP) in a first subnet, to associate with a first WLAN IP address in the first subnet, and to use the first WLAN IP address for an application in the first subnet;
      to establish a second communications link with a second WLAN AP when the mobiles station transitions between the first subnet to a second subnet; and
      to use the first WLAN IP address established with the first subnet for a persistent connection in the second subnet without another address being assigned to the mobile station when the application benefits from a persistent connection and for the duration of the persistent connection.

16. The mobile station of claim 15, wherein a first agent associates the first WLAN IP address to the MNIP address.

17. The mobile station of claim 16, wherein the controller is further cooperatively operable with the transceiver to request a second WLAN IP address in the second subnet when the persistent connection is no longer needed.

18. The mobile station of claim 17, wherein the controller is further cooperatively operable with the transceiver: to communicate with the first agent; and to associate the second WLAN IP address to the MNIP address, thereby changing association information.

19. An access point (AP) operating and facilitating mobility within a wireless local area network (WLAN), the AP comprising:
   a transceiver operable to support communications links within the WLAN;
   a controller cooperatively operable with the transceiver:
      to establish a communications link to a mobile station;
      to recognize when the mobile station uses a first WLAN internet protocol (WLAN AP) address that is different from IP address range supported by the AP;
   to initiate a tunnel to a first subnet upon recognition that the first WLAN IP address is different from the IP address range supported by the AP and wherein the tunnel supports a persistent connection as the mobile station transitions to the first subnet and for the duration of the persistent connection so that mobile station uses the WLAN IP address during the persistent connection without another address bring assigned to the mobile station; and
   to terminate the tunnel when the persistent connection is no longer needed.

20. The access point of claim 19, wherein the controller cooperatively with the transceiver operates to facilitate mobile IP registration with a home agent to associate a Mobile Node IP (MNIP) address for the mobile station with the second WLAN IP address as a Care of Address for the mobile station.

21. The access point of claim 20 wherein the controller is further cooperatively operable with the transceiver to terminate the tunnel when the mobile station makes a DHCP request.

* * * * *